Oct. 28, 1924.
F. HUISMAN
BRAKE BEAM
Original Filed June 4, 1921  2 Sheets-Sheet 1
1,513,708
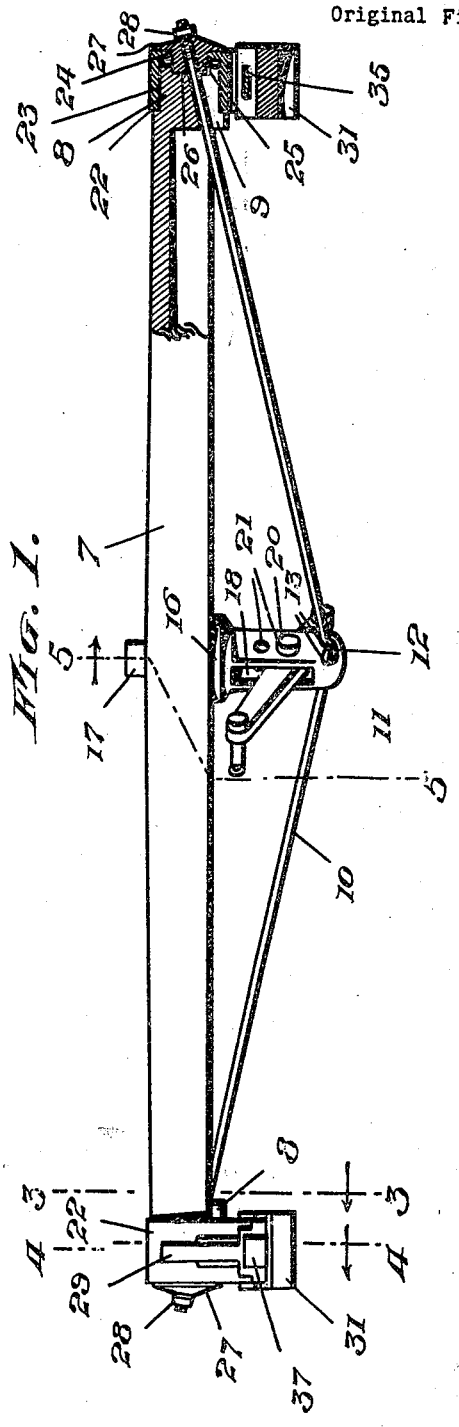
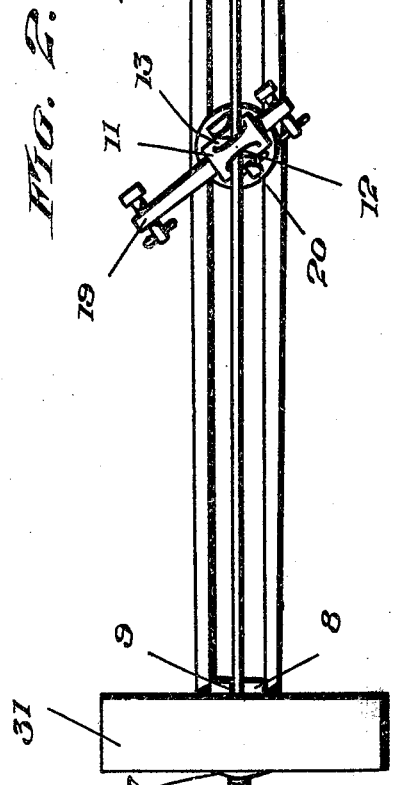
INVENTOR
F. HUISMAN
by W. J. Fitz Gerald & Co.
ATTORNEYS.

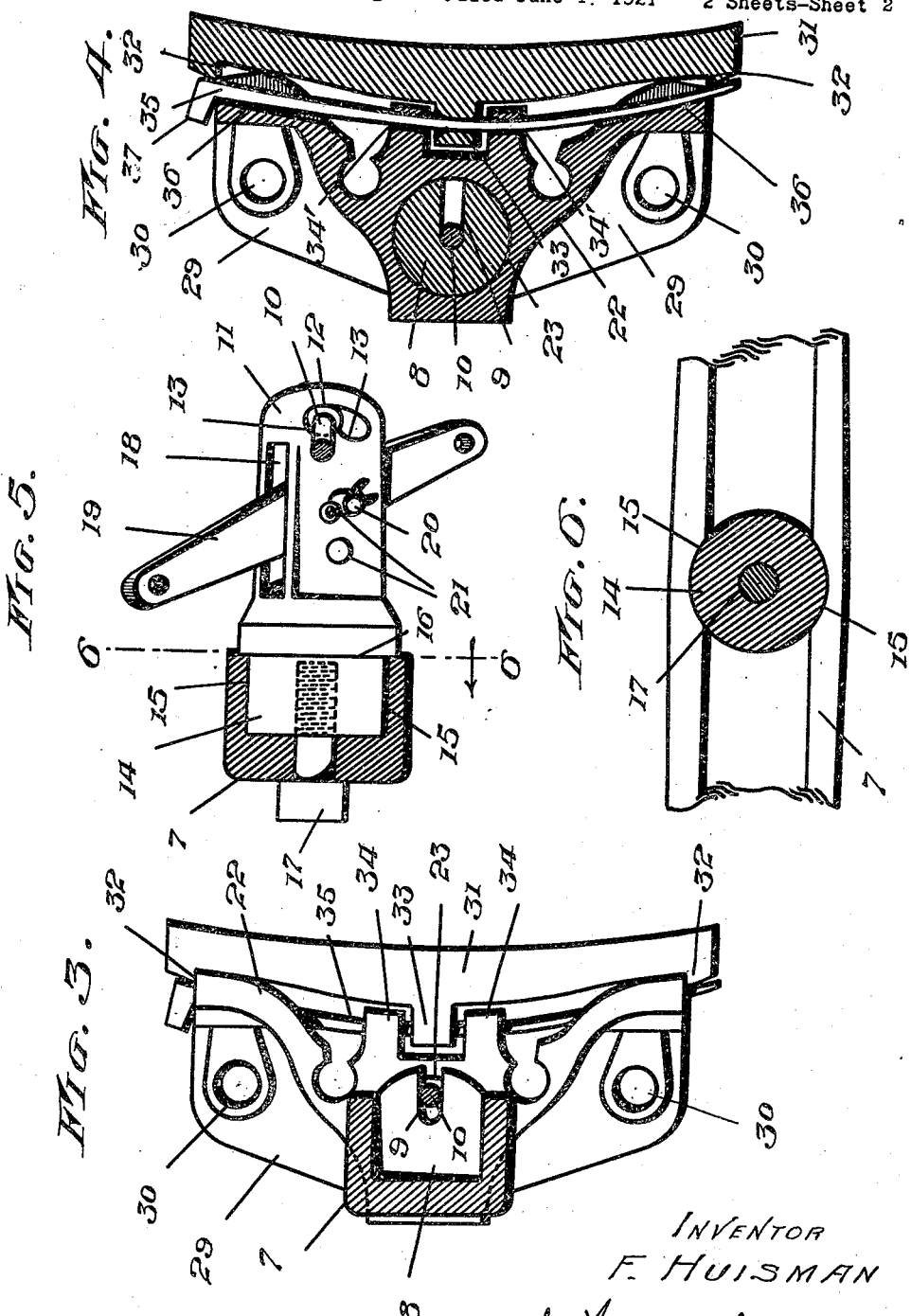

Patented Oct. 28, 1924.

1,513,708

UNITED STATES PATENT OFFICE.

FRANK HUISMAN, OF OSHKOSH, WISCONSIN.

BRAKE BEAM.

Application filed June 4, 1921, Serial No. 475,041. Renewed June 12, 1924.

*To all whom it may concern:*

Be it known that I, FRANK HUISMAN, a citizen of the United States, residing at Oshkosh, in the county of Winnebago and State of Wisconsin, have invented certain new and useful Improvements in Brake Beams; and I do hereby declare the following to be a full, clear, and exact description of the invention, such as will enable others skilled in the art to which it appertains to make and use the same.

The present invention relates to brake beams of railroad cars, and aims to provide novel and useful improvements in brake beam constructions.

Another object is the provision of a novel assemblage of the brake beam proper, truss rod and brake heads, to provide a strong and durable structure, and which enables the parts to be readily assembled and separated.

A further object is the provision of a truss post between the truss rod and beam constructed and arranged in a novel manner, and also enabling the device to be reversed for either a right or a left brake beam.

A still further object is the provision of reversible brake heads on the ends of the beam, whereby the entire brake beam construction is reversible.

It is also an object of the invention to provide such a brake beam construction which is also comparatively simple and inexpensive, as well as being thoroughly practical and efficient in use.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:—

Figure 1 is a plan view of the device, portions being shown in section taken on the line 1—1 of Fig. 2.

Fig. 2 is a face elevation of the device.

Figs. 3, 4 and 5 are enlarged cross sections on the respective lines 3—3, 4—4 and 5—5 of Fig. 1.

Fig. 6 is a section on the line 6—6 of Fig. 5.

The brake beam proper, designated 7, is of channel shape, with the flanges at the top and bottom and projecting in the direction toward which the brake shoes face. The beam 7 is formed at its ends with studs 8 of circular cross-section, the studs 8 having longitudinal radial slots 9 extending in the same direction as the flanges of the beam, for receiving the terminal portions of the truss rod 10.

A truss post or member 11 is disposed between the intermediate portions of the beam 7 and rod 10, and is provided adjacent to one end with a slot 12 through which the rod 10 extends. The slot 12 is formed with grooves or seats 13 for the rod 10, which cross one another, whereby the rod 10 can seat in either groove, according to the position of the post 11, and enabling said post to be turned about its axis to reversed positions.

The post 11 is swivelled to the beam 7. Thus, the end of the post adjacent to the beam has a stud 14 of circular outline fitted in the beam, and the flanges of the beam have concaved recesses 15 receiving said stud, for the turning movement of the post. The post has a shoulder 16 to bear against the edges of the flanges of the beam, and a clamping screw 17 is inserted through an aperture in the web of the beam 7 and is screw-threaded into the stud 14 to clamp the post against the beam. When the screw 17 is loosened and the rod 10 also loosened, the post 11 can be turned from one position to the other, the rod 10 moving from one groove 13 to the other accordingly.

The post 11 has a slot 18 therethrough between its ends for the reception of a lever 19 of the brake applying mechanism, and said lever is fulcrumed on a pin 20. The post has a plurality of apertures 21 at longitudinally spaced points, for the reception of the pin 20, and permitting the lever 19 to be adjusted. Said lever can also be reversed end for end, to comply with the reversibility of the device throughout.

The brake heads 22 are disposed at the ends of the beam transversely thereof, and are provided at those sides adjacent to the beam with sockets or recesses 23 snugly receiving the studs 8 on the ends of the beam, and the opposite end portions of the heads are alike, in order that they can be reversed and used at either end of the beam, the heads being duplicates of one another. The heads 22 are provided at those sides opposite to the beam with openings 24 concentric with and smaller than the sockets 23 in which plugs 25 are fitted, the ends of the studs 8 having recesses 26 receiving said plugs. The plugs have flanges 27 overlapping said sides of the brake heads, and the terminals of the rod 10 extend through the apertures of the plugs 25 and have nuts 28 threaded thereon seating against said plugs, and clamping the plugs 25, heads 22 and studs 8 of the brake beam tightly together, as well as placing a tensile strain on the rod 10 and a compression strain on the beam 7, to make the structure rigid and strong under the strains to which the beam is subjected from the lever 19. The brake heads are thus secured rigidly on the ends of the brake beam in an effective manner, and the parts are interchangeable and reversible.

Each brake head is provided at its opposite ends with the webs 29 at the back thereof having apertures 30 for the engagement of the brake beam hanger, in order that the upper end of the head can be connected with the hanger in either position of the head.

A brake shoe 31 is carried by each head 22, and is provided at its ends with shoulders 32 to engage and abut the ends of the head, to assist in holding the shoe rigidly in place. The shoe 31 is provided between its ends with a rearwardly extending lug 33 to project between a pair of forwardly extending lugs 34 with which the head is provided between its ends, and said lugs 33 and 34 have the slots 34' to register with one another for the passage of a tapered key 35. The end portions of the head 22 have channels 36 for the passage of the key, and the shoe as well as the head are reversible end for end, and the key can be driven longitudinally between the shoe and head in either direction. The key when driven into place is sprung so that its end portions bear against the head within the channels 36, and the lug 33 is therefore anchored to the head, for holding the shoe firmly in place on the head. The key 35 has a head or striking portion 37 at its larger end, to receive the blows of a hammer or other implement in driving the key into place.

Not only is the present construction strong and durable, to withstand wear and tear, but the device is also reversible, to use the beam either for a right or left hand beam. In reversing the beam end for end or in turning it upside down, the post 11 can be turned to reverse it if necessary, by loosening the nuts 28 and screw 17, and the lever 19 can also be reversed in the post. The brake heads, shoes, and plugs 25 at the opposite ends are also duplicates, and said heads and shoes can be reversed end for end or interchanged.

Having thus described the invention, what is claimed as new is:—

1. A brake beam of channel shape, a truss rod for the beam, and a post between the rod and beam having a circular stud fitted within the beam, the flanges of the beam having concaved recesses receiving said stud.

2. A brake beam of channel shape, a truss rod therefor, a post between said rod and beam having a circular stud fitted within the beam, the flanges of the beam having concaved recesses receiving said stud, the post having a shoulder to bear against the edges of said flanges, and means connecting the stud and beam for drawing them together.

3. A brake beam having a terminal stud, a brake head having a socket receiving said stud and an opening, a plug fitted in said opening and bearing against said head, a truss rod extending through said stud and plug, and means on the rod for clamping said plug, head and stud together.

4. A brake beam having a terminal stud with a radial slot, a brake head having a socket receiving said stud and an opening, a plug fitted in said opening and having a flange bearing against said head, a truss rod extending through said slot and the plug, and means on the rod bearing against said plug for clamping the plug, head and stud together.

In testimony whereof I have signed my name to this specification in the presence of two subscribing witnesses.

FRANK HUISMAN.

Witnesses:
 HENRY BARBER,
 FRANK B. KEEFE.